Figure 1:
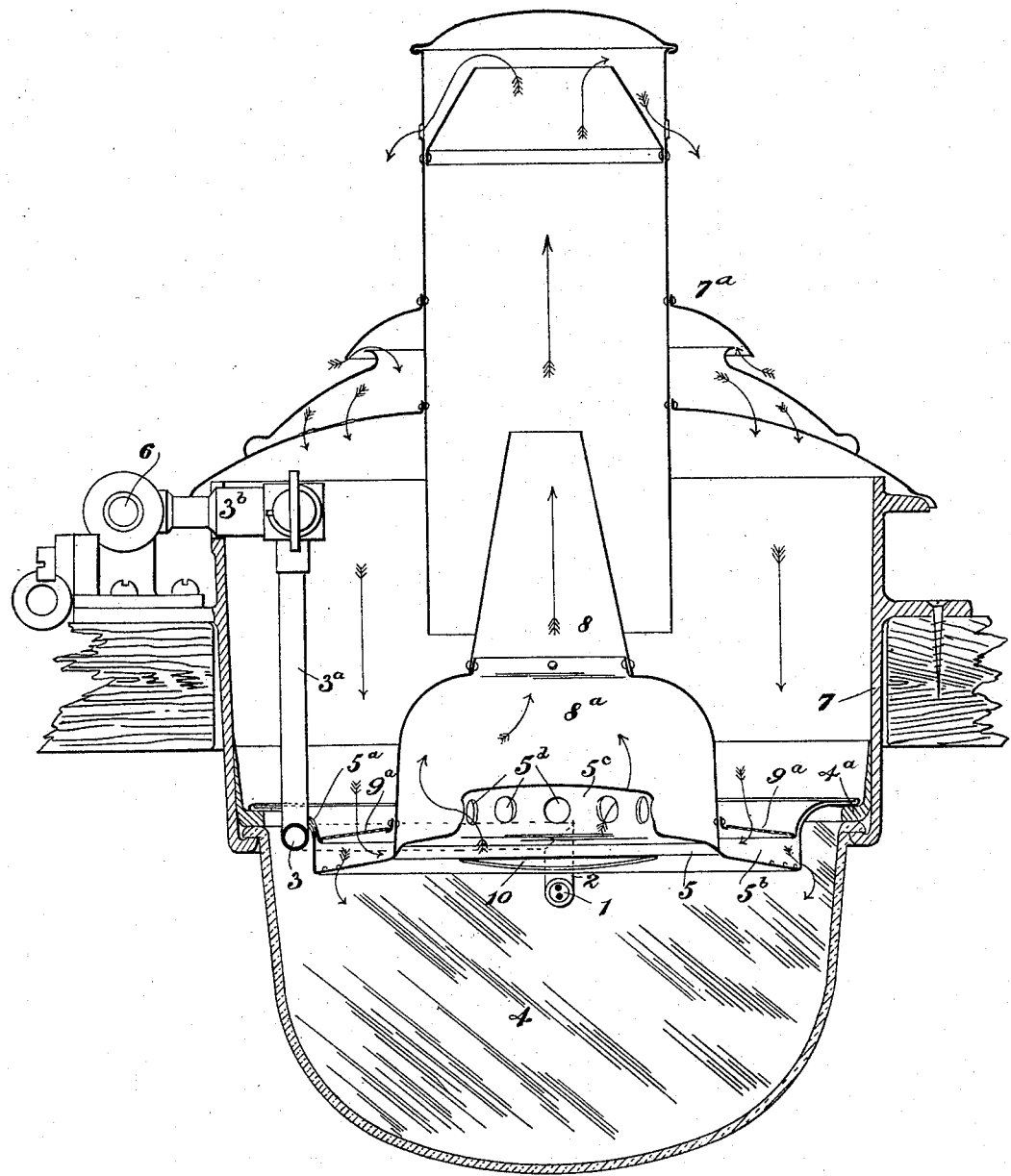

(No Model.) 11 Sheets—Sheet 1.

T. C. J. THOMAS & W. M. STILL.
GAS LAMP.

No. 580,810. Patented Apr. 13, 1897.

Witnesses.
C. M. Werle
A. B. Diggs

Inventors
T. C. J. Thomas and W. M. Still
per O. E. Duffy atty.

(No Model.) 11 Sheets—Sheet 3.

T. C. J. THOMAS & W. M. STILL.
GAS LAMP.

No. 580,810. Patented Apr. 13, 1897.

Witnesses.
C. M. Werle
A. B. Diggs

Inventors
T. C. J. Thomas and W. M. Still
per O. E. Duffy
atty.

(No Model.) 11 Sheets—Sheet 4.
T. C. J. THOMAS & W. M. STILL.
GAS LAMP.

No. 580,810. Patented Apr. 13, 1897.

Witnesses.
C. M. Werle
A. B. Driggee

Inventors
T. C. J. Thomas and W. M. Still (No Model.) 11 Sheets—Sheet 7.
T. C. J. THOMAS & W. M. STILL.
GAS LAMP.

No. 580,810. Patented Apr. 13, 1897.

Witnesses
Inventors.

(No Model.) 11 Sheets—Sheet 8.
T. C. J. THOMAS & W. M. STILL.
GAS LAMP.

No. 580,810. Patented Apr. 13, 1897.

Witnesses.
C. M. Werle
E. C. Duffy

Inventors
T. C. J. Thomas
and
W. M. Still
O. E. Duffy
per
Attorneys

THE NORRIS PETERS CO., PHOTO-LITHO., WASHINGTON, D. C.

(No Model.) 11 Sheets—Sheet 9.
T. C. J. THOMAS & W. M. STILL.
GAS LAMP.

No. 580,810. Patented Apr. 13, 1897.

Witnesses
C. M. Werle
A. B. Digger

Inventors.
T. C. J. Thomas and W. M. Still
per O. E. Duffy
att.

(No Model.) 11 Sheets—Sheet 10.
T. C. J. THOMAS & W. M. STILL.
GAS LAMP.

No. 580,810. Patented Apr. 13, 1897.

(No Model.) 11 Sheets—Sheet 11.
T. C. J. THOMAS & W. M. STILL.
GAS LAMP.
No. 580,810. Patented Apr. 13, 1897.
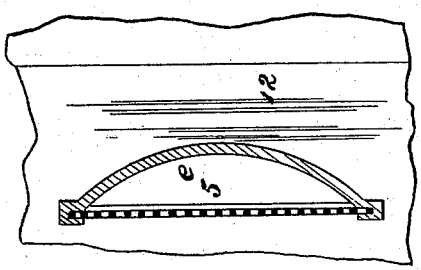
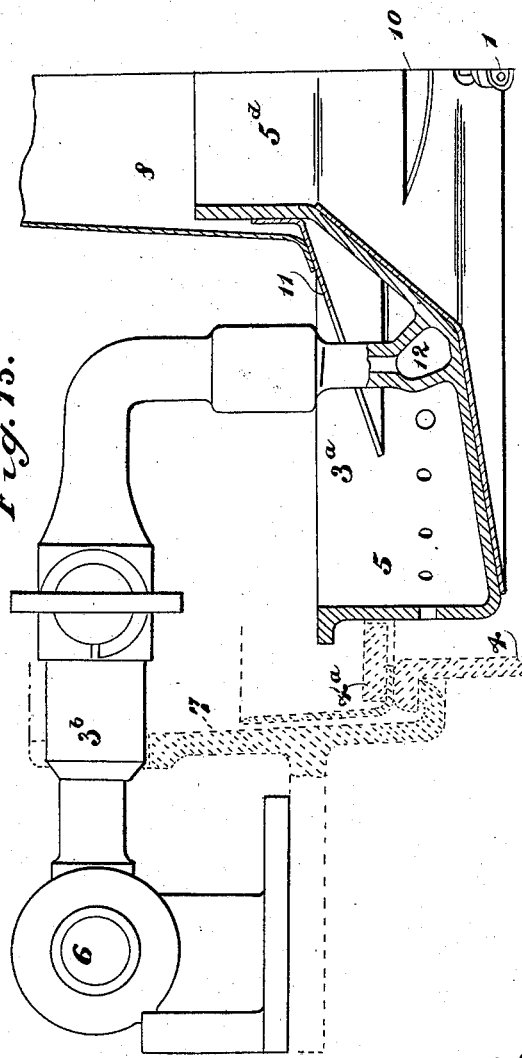
Witnesses
O. M. Werle
A. B. Digger
Inventors
T. C. J. Thomas and W. M. Still
per O. E. Duffy
atty.

UNITED STATES PATENT OFFICE.

THOMAS COOPER JOHN THOMAS AND WILLIAM MUDD STILL, OF LONDON, ENGLAND.

GAS-LAMP.

SPECIFICATION forming part of Letters Patent No. 580,810, dated April 13, 1897.

Application filed February 25, 1896. Serial No. 580,635. (No model.) Patented in England January 7, 1895, No. 435; in France January 31, 1896, No. 253,602; in Belgium February 15, 1896, No. 119,659; in Austria June 1, 1896, No. 46/2,163, and in India July 1, 1896, No. 76, and November 3, 1896, No. 218.

*To all whom it may concern:*

Be it known that we, THOMAS COOPER JOHN THOMAS and WILLIAM MUDD STILL, subjects of the Queen of Great Britain and Ireland, residing at London, England, have invented Improvements in Gas-Lamps, of which the following is a specification.

This device has been patented by us in the following countries: England, January 7, 1895, No. 435; France, January 31, 1896, No. 253,602; Belgium, February 15, 1896, No. 119,659; Austria, June 1, 1896, No. 46/2,163, and India, July 1, 1896, No. 76, and November 3, 1896, No. 218.

This invention has reference to improvements in gas-lamps of the kind having one or more flat-flame burners arranged within a closed bowl or chamber below a reflector and suitable for overhead lighting—as, for example, railway-carriage and street lighting. In such a lamp, according to this invention, the burner or burners is or are adapted to project toward the center of the lamp, and the flame presents a broad or extended surface to a reflector, which is provided with a comparatively large air-supply opening arranged above and in proximity to the burner or with more than one such opening, each arranged above and in proximity to a burner and with a raised central portion having one or more exit-openings for escape of hot gases and products of combustion, the arrangement being such that a body of air will be delivered through the air-opening or through each such opening and directed upon the upper surface of the flame issuing from the burner below, so that such flame will be directed toward the raised central portion of the reflector and blackening of the reflector prevented.

Figure 2:
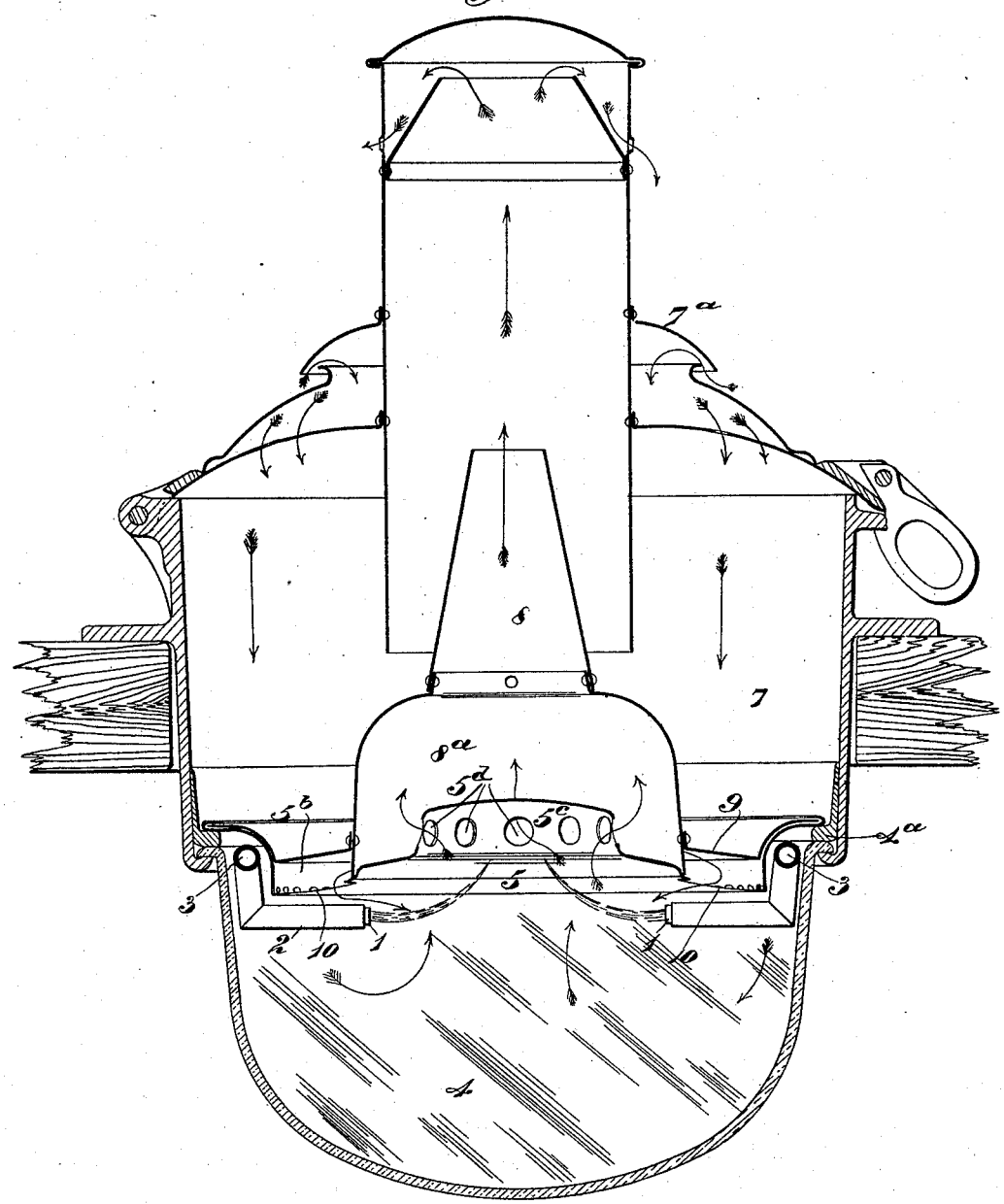
Figure 3:
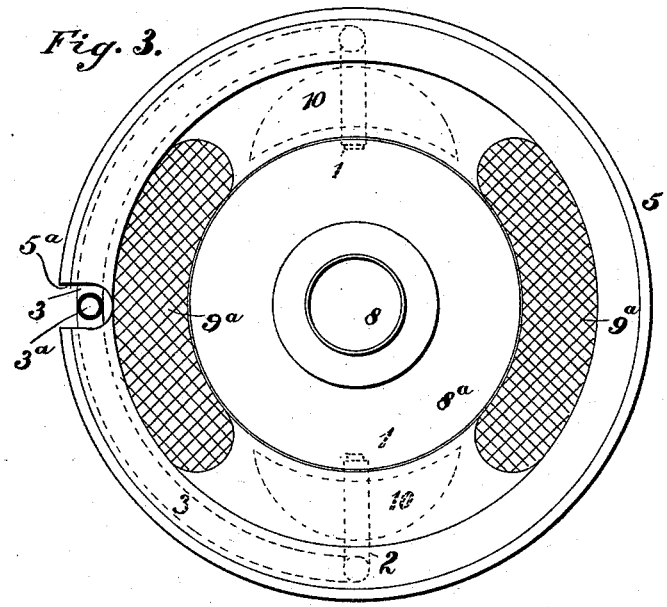
Figure 4:
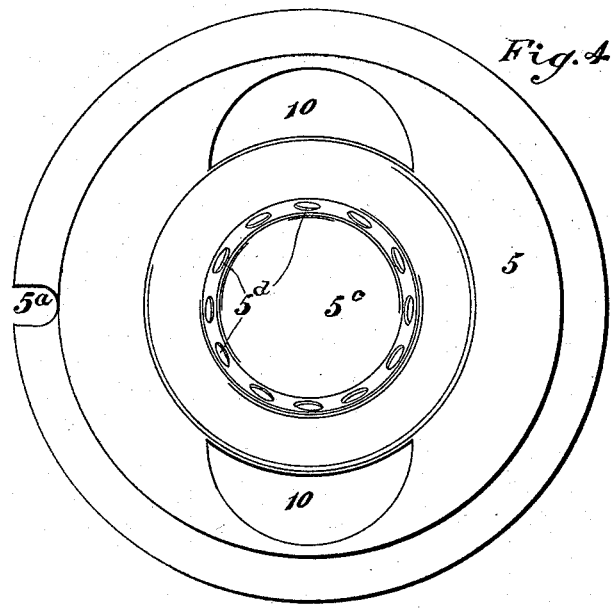
Figure 5:
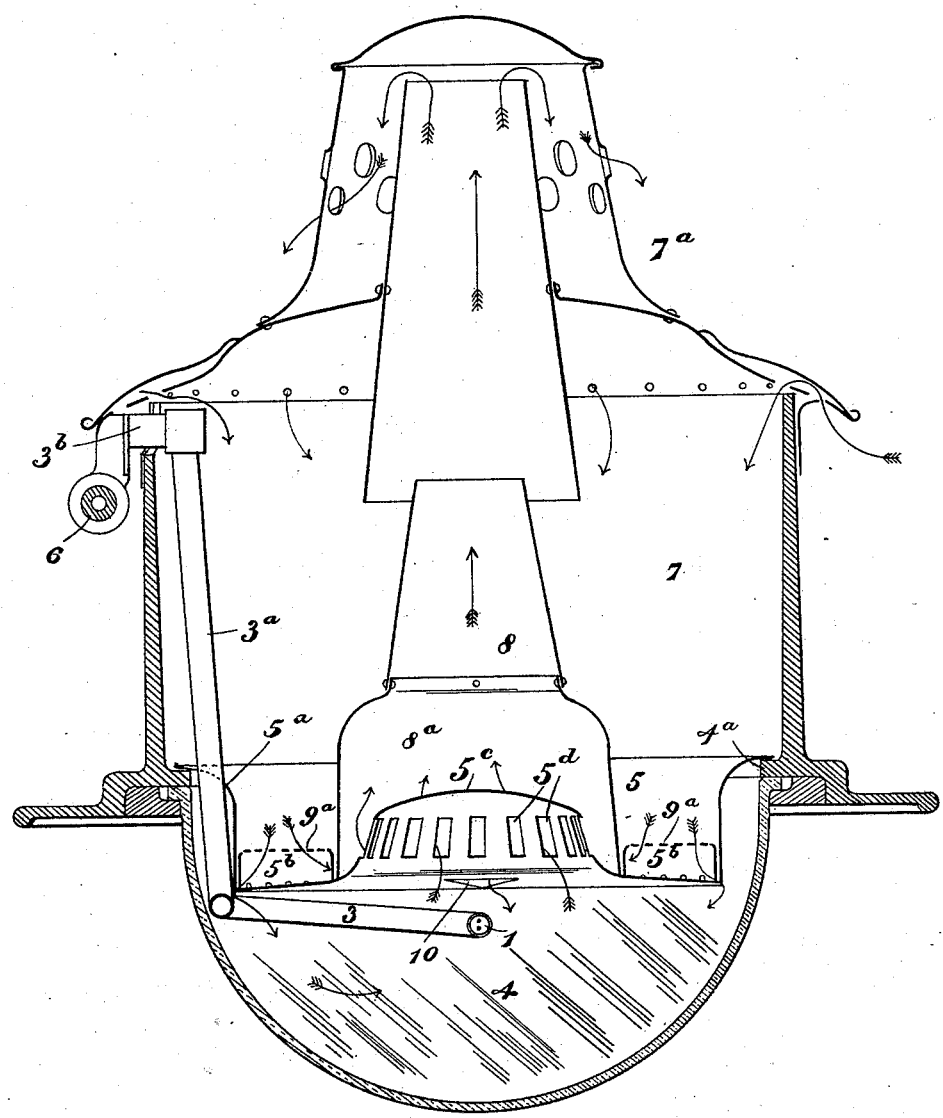
Figure 6:
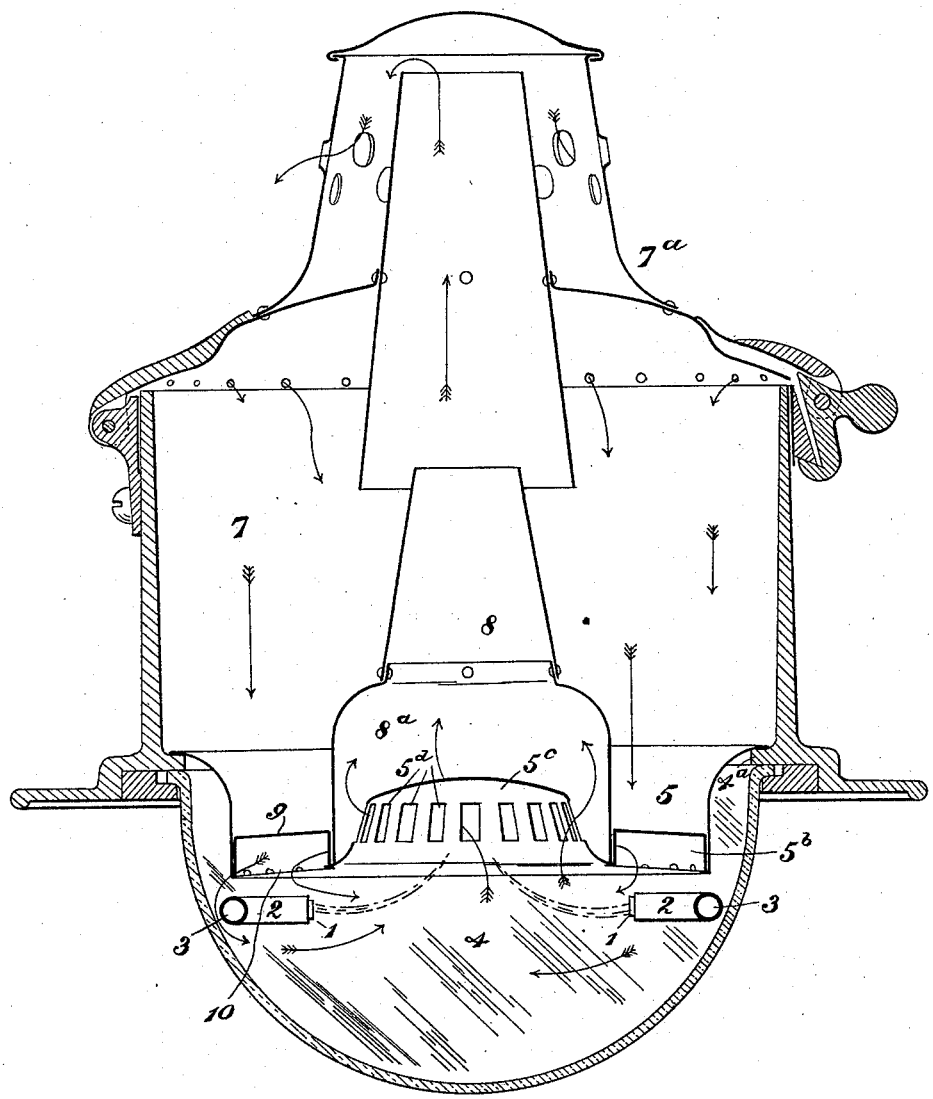
Figure 7:
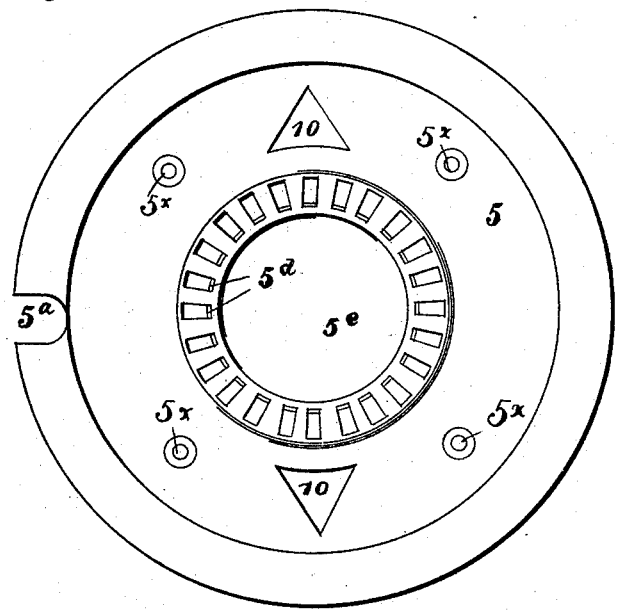
Figure 8:
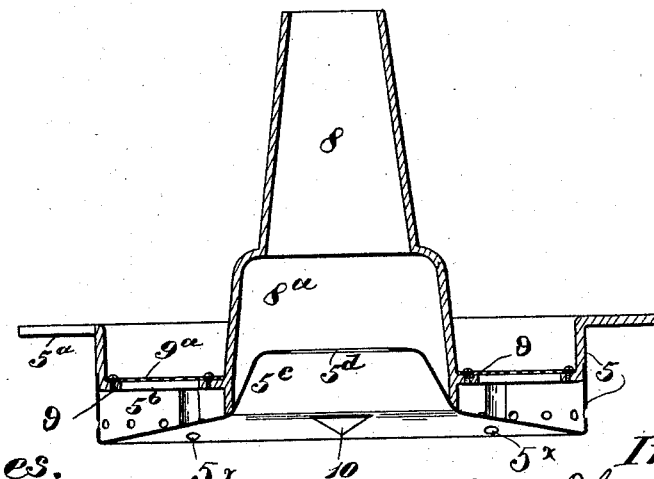
Figure 11:
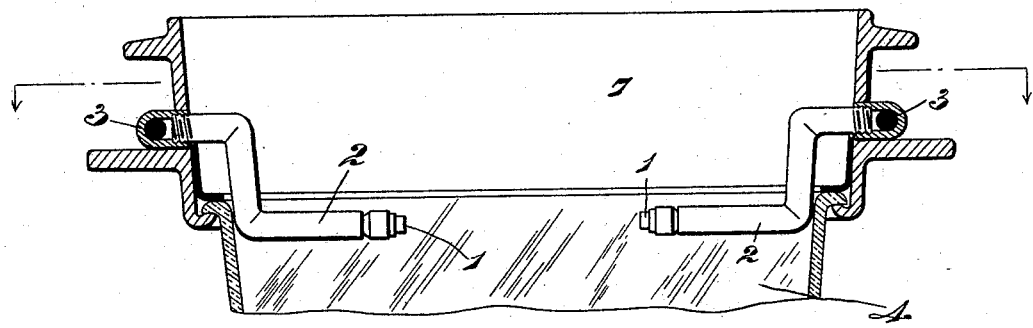
Figure 12:
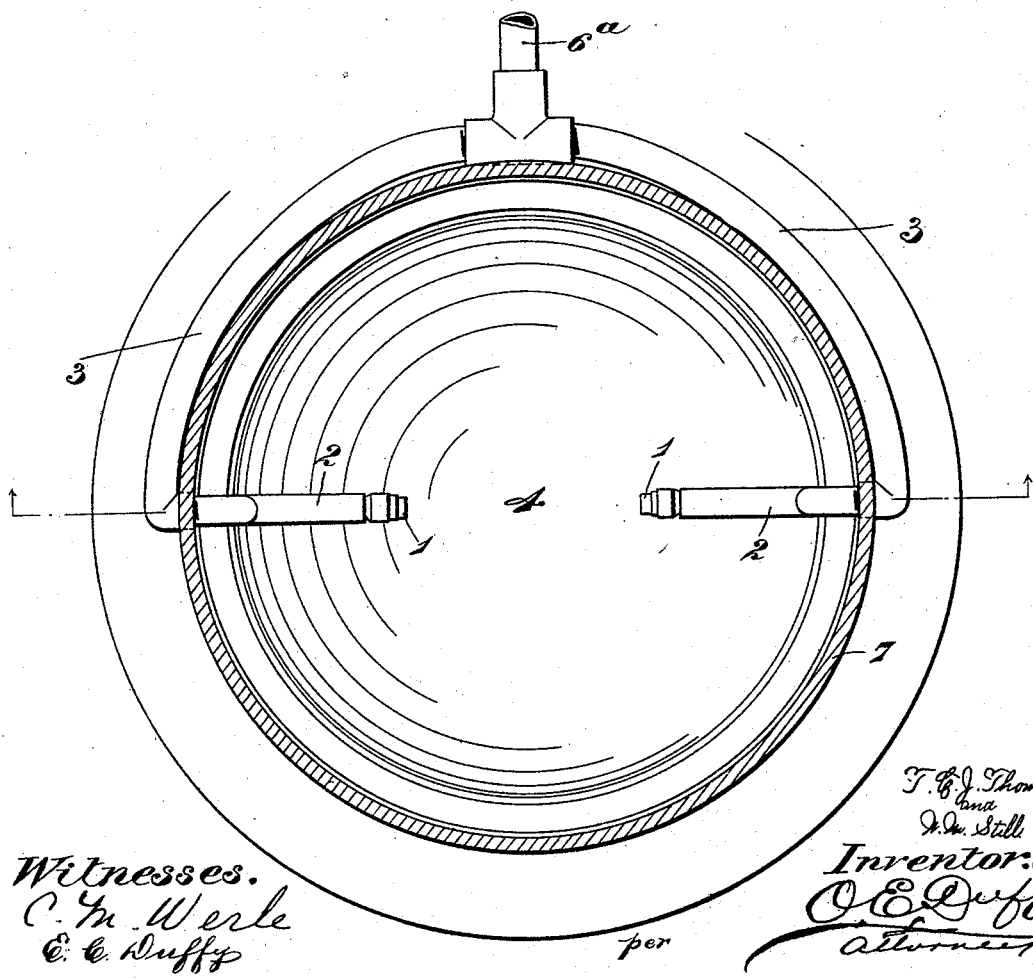
Figure 13:
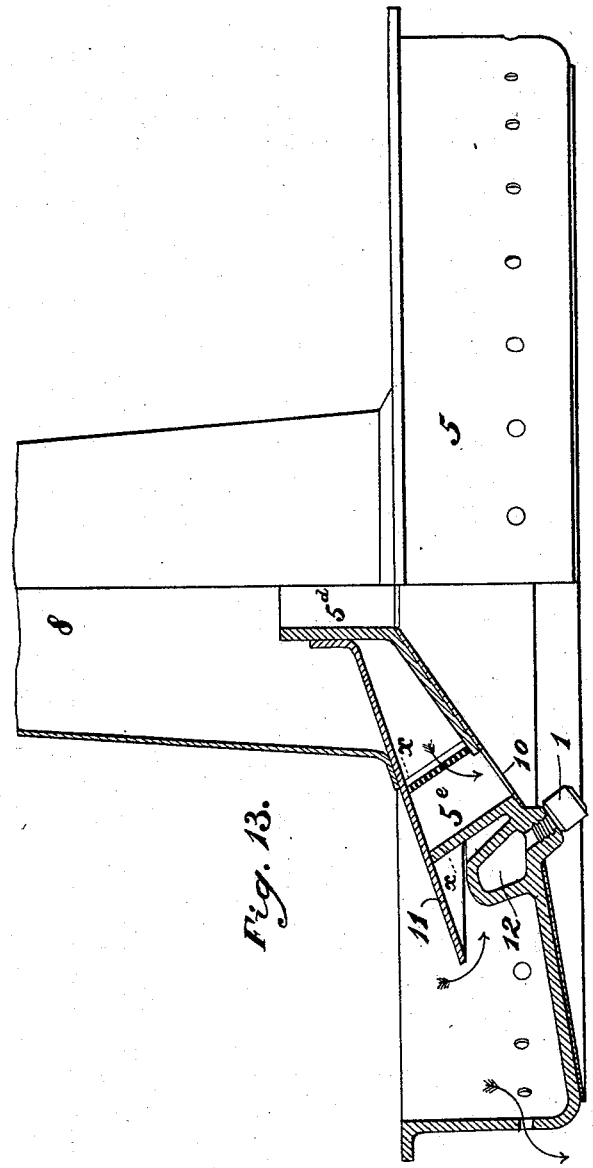
Figure 14:
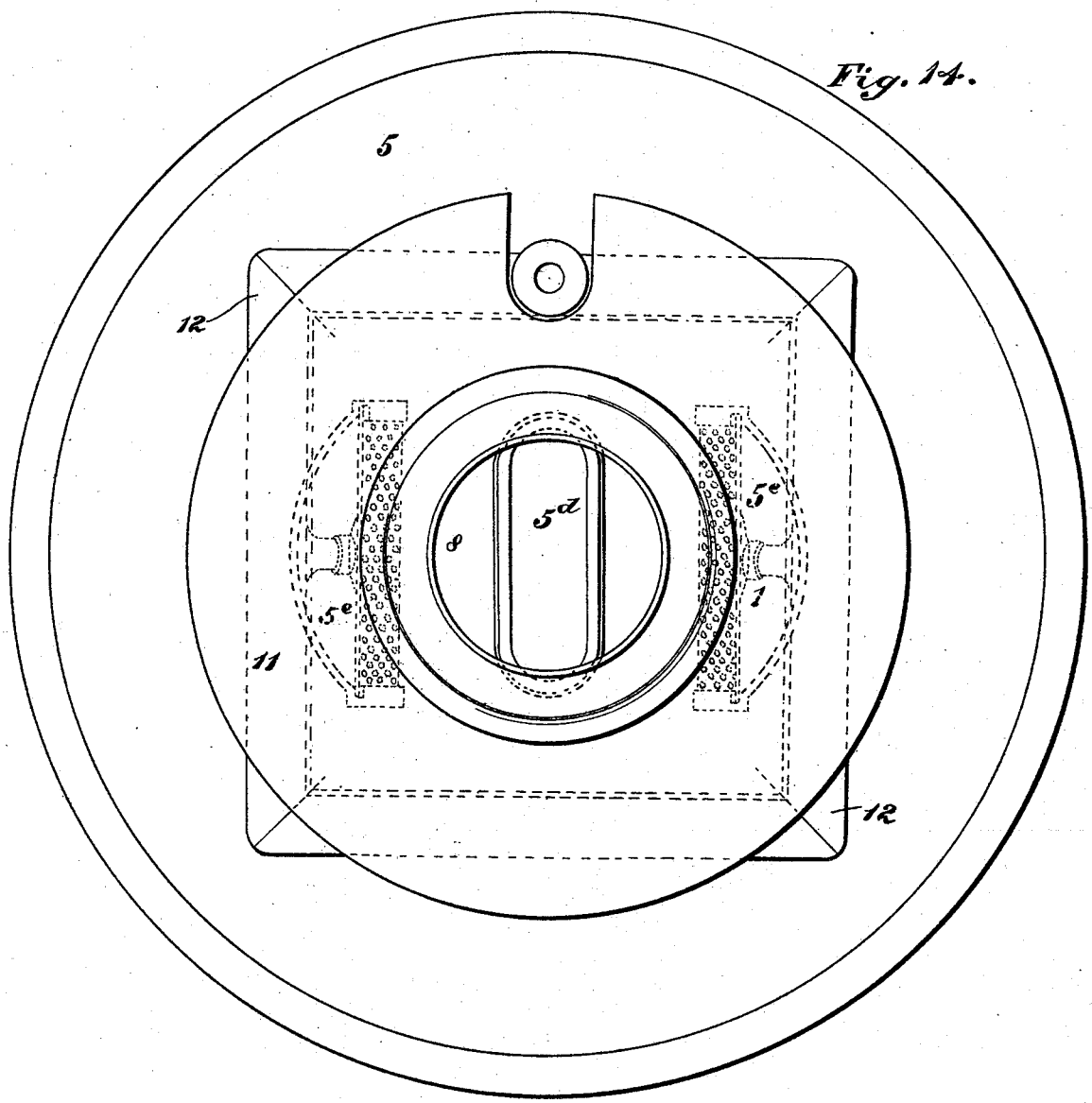

Figures 1 and 2 of the accompanying drawings are vertical sections at right angles to each other, showing our invention applied to a railway-carriage roof-lamp of the well-known Pintsch type. Figs. 3 and 4 are respectively upper and under side views of the reflector shown in Figs. 1 and 2. Figs. 5, 6, and 7 are similar views to Figs. 1, 2, and 4, respectively, showing the invention applied to a railway-carriage roof-lamp of the well-known Pope type. Fig. 8 shows in vertical section, Fig. 9 in plan or top view, and Fig. 10 in under side view, a modified form of reflector according to this invention. Figs. 11 and 12 are respectively a part vertical section and a horizontal section showing a modified arrangement of our lamp. Fig. 13 shows, partly in vertical section and partly in elevation, a modified construction of a combined reflector and chimney for a railway-carriage roof-lamp. Fig. 14 is a plan thereof. Fig. 15 is a part vertical section taken in a plane at right angles to Fig. 13, part of the lamp body and bowl being shown in dotted lines. Fig. 16 is a section on the lines $x\ x$ of Fig. 13.

In the arrangement shown in Figs. 1 and 2 there are two oppositely-arranged horizontal flat-flame burners 1 of the ordinary well-known Pintsch kind carried by elbows 2, attached to a horizontal pipe 3, that is bent to a circular form, as indicated in dotted lines in Fig. 3, the burners being so arranged that the flames extending therefrom will have their flat sides toward the top of the lamp. The pipe 3 is located between the lamp-bowl 4 and the outer periphery of the loose removable reflector 5, and at its central part is connected to a vertical gas-supply pipe $3^a$, which by the horizontal pipe $3^b$, into which it is screwed, is hinged or pivoted in the well-known manner to the main gas-supply pipe 6, so that the combined gas-supply pipes 3 $3^a$ $3^b$ with burners 1 can, after turning back the lamp-head $7^a$ and lifting out the reflector, be swung out of the lamp-casing 7 for the purpose of cleaning or replacing the lamp bowl or burners.

The reflector 5, which merely rests upon a ring $4^a$, so that it is separately removable independently of the gas-supply pipe, and is notched at $5^a$ to accommodate the pipe $3^a$, is provided with an annular air-supply chamber $5^b$, formed by and between the reflector, the lower enlarged part $8^a$ of the chimney 8, and an outwardly-extending annular plate 9, these parts being secured together, so as to form a combined reflector, air-supply chamber, and chimney. The plate 9, forming the top of the air-chamber, is perforated, as shown at $9^a$, for admission of air to the chamber, the perforations being arranged at about right angles to the two air-outlet openings 10 in the reflector. The openings 10, which are of comparatively large size and of concavo-convex shape, are located above the elbows 2, carrying the burners 1, so that the air issuing through them will impinge upon the upper surface of the flame extending from each burner, and thereby impart a curved form to such flame and direct it toward the central portion of the reflector 5. The reflector is formed with a raised or recessed central part $5^c$, that may be of dished shape, as shown, or of conical or other shape, and is pierced with an annular row or rows of holes $5^d$ for the escape of the heated air and products of combustion from the bowl 4 into the chimney 8. The under side of the top wall 9 of the air-chamber is or may be enameled or provided with an enameled plate above each air-outlet opening 10, so that no dark space will be seen at this part.

In the arrangement illustrated in Figs. 5, 6, and 7, which is substantially like the other, the flat-flame burners 1 are directly attached to the inwardly-bent ends 2 of the circularly-curved pipe 3, which is slightly inclined and suspended, as before, by the hinged or pivoted pipes $3^a$ $3^b$, and the air-openings 10, formed in the reflector above the burners, are each of a triangular shape, (see Fig. 7,) which, so far as trials have shown, gives the best results.

There may be only one burner, or more than two burners, arranged or each arranged, as described, below an air-exit opening communicating with an air-supply chamber in the reflector above; also, the burner or burners instead of being carried by a hinged or pivoted gas-supply pipe $3^a$, as described, may be carried by a fixed gas-supply pipe $6^a$, as shown in Figs. 11 and 12, in which case the bent pipe 3 may be outside the lamp-body or casing 7, through which the elbows or bent ends 2, which are then made removable, are arranged to project. We prefer, however, the arrangement shown in Figs. 1 to 6, inclusive, as it enables our invention to be readily and quickly applied to the existing lamp-bodies of the Pintsch and Pope lamps without disturbing them, all that is necessary to be done for this purpose being to replace the ordinary dependent gas-supply pipe and burner or burners by our pipes 3 $3^a$ and burner or burners 1 and to lift out the existing reflectors and replace them by our improved reflectors.

Figure 9:
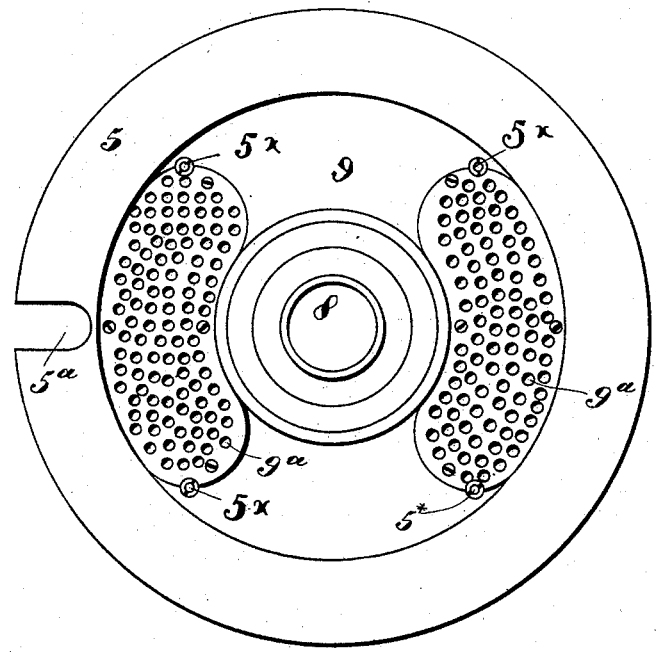
Figure 10:
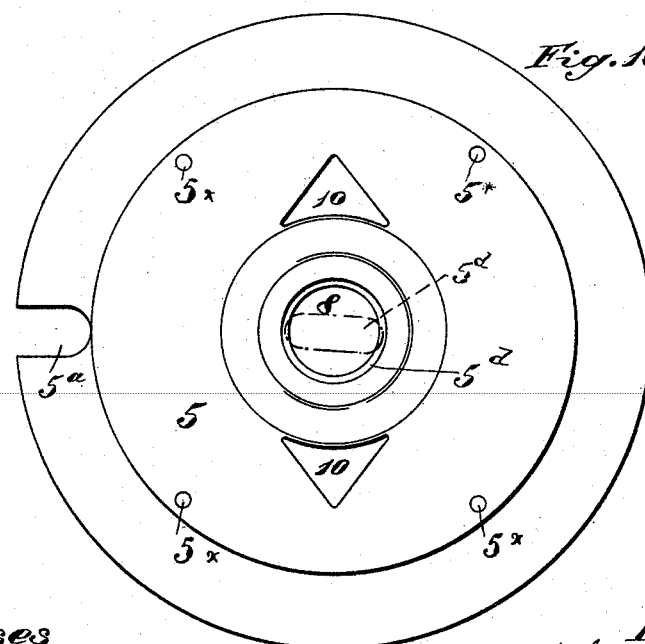

Figs. 8, 9, and 10 show a modified construction of combined reflector, air-chamber, and chimney in which the raised central portion $5^c$ of the reflector 5, instead of being provided with a row of exit-openings $5^d$, as in Figs. 1 to 7, has a single central exit-opening $5^d$ to better enable the lamp to be lighted from the top of the chimney 8 without removing the reflector and attached parts. The said exit-opening may be of circular form, as seen in full lines, or in the form of an elongated slot, as shown in dotted lines in Fig. 10, or in other form, as may be desired. In the hereinbefore-described arrangements, Figs. 1 to 7, the combined reflector, air-chamber, and chimney are of spun or stamped sheet metal. In the example now being described the reflector proper, 5, only is of spun or stamped sheet metal, and it is secured, as by screws $5^x$, to a dished and flanged top plate 9, which, as well as the chimney, is of cast metal. This construction enables the reflector proper to be easily and cheaply renewed when necessary.

When the reflector is to be used with a single burner arranged as described, it will of course have above it a single outlet-opening 10, of crescent, triangular, segmental, or other equivalent shape.

In the arrangement shown in Figs. 13 to 16, inclusive, the burners 1, of which two are shown, are secured to the central portion of the reflector below air-exit openings 10 therein, each of which is in the form of a plano-concave slot and communicates with a short air-supply pipe $5^e$ of plano-convex section, (see Fig. 16,) the air-inlets to the pipes $5^e$ being protected by a conical baffle or guard 11, carried by the reflector. To further steady the current of air flowing through each opening 10, one on each side of each pipe $5^e$ may be perforated, in which case the baffle or guard 11 may rest upon the end of the pipe. In the example shown only one side is perforated, such side being formed by a removable piece of perforated sheet metal. Each burner 1 is in connection with a gas-box 12, that is arranged to be cooled by the inflowing air and is connected with the main gas-supply pipe 6, Fig. 15, by a pipe $3^b$, pivoted thereto, so as to enable the reflector and attached parts to be swung out of the lamp-casing for cleaning or other purpose. The body of the reflector is shown as of cast metal enameled on its lower and inner surface. The central portion of the reflector, to which the burner or burners is or are secured, is made of pyramidal form, as shown, or of equivalent form, for example, conical, and terminates in an exit-opening $5^d$ at the bottom of the chimney 8. As in the previous cases, there may be only one burner, 1, or more than two, each with an air-exit opening, such as 10, above it.

By providing a comparatively large air-opening above each burner and making the reflector with a central raised portion, as hereinbefore described, all liability of the flat flame smoking or blackening the reflector is obviated both when the gas is turned full onto the burner and also when supplied to the burner only in small quantity sufficient to prevent the lamp going out, and such as is usually provided for by a small passage or by-pass in the gas-cock on the main gas-supply pipe, as well understood and commonly employed.

We do not limit ourselves to the use of an airway 10 of any one of the shapes shown, as other forms may be used so long as they be each such as to enable a comparatively large body of air to be delivered upon the upper surface of the flame below it. We have, however, obtained the best results by using clear unobstructed openings 10 of the general type shown—that is to say, having their widest part at the center and above the burner and decreasing to zero on each side.

What we claim is—

1. In a gas-lamp of the kind herein referred to, the combination of a burner or burners adapted to project toward the center of the lamp-flame that presents a broad or extended surface toward the top of the lamp, and a reflector having a comparatively large air-delivery opening 10 arranged above and in proximity only to the burner or to each burner and a raised central portion provided with one or more exit-openings for hot gases and products of combustion, substantially as described.

2. In a gas-lamp, the combination of a lamp bowl or chamber, a burner or burners adapted to project flame that presents a broad or extended surface toward the top of the lamp, and a reflector or cover arranged above the bowl or chamber and provided with a comparatively large non-circular air-supply opening arranged above and in proximity only to the burner, or to each burner, and with a raised portion having one or more exit-openings, for hot gases and products of combustion, said air-supply opening or openings being or each being so shaped that its width is greatest at or about its center and gradually decreases to zero on each side, substantially as described.

3. A gas-lamp comprising a lamp-casing with bowl, a reflector arranged above said bowl and having a raised central perforated portion located below the lamp-chimney and one or more air-supply openings 10 arranged at one side of or around the central portion, and one or more flat-flame burners arranged or each arranged below and in proximity to one only of said openings, substantially as herein described for the purpose specified.

4. A gas-lamp comprising a lamp body or casing with bowl, one or more burners adapted to project flame that presents a broad or extended surface toward the top of the lamp, a hinged or pivoted gas-supply pipe carrying said burner or burners and a reflector arranged at the top of said bowl and having an air-supply opening located above or in proximity only to said burner or to each burner and a raised portion provided with one or more exit-openings arranged below the lamp-chimney, substantially as described.

5. In a gas-lamp, the combination of a gas-supply pipe hinged or pivoted at its upper end to a main gas-supply pipe, one or more flat-flame burners 1 carried by said gas-supply pipe and arranged as specified, and a combined reflector, air-supply chamber and chimney arranged to rest at the top of said bowl, said reflector having in its outer part one or more air-outlet openings 10 communicating with said air-supply chamber, and in its central portion one or more exit-openings for hot gases, said air-outlet opening or each of them being arranged above and in proximity only to a burner, and the said exit-opening being in communication with said chimney, substantially as described.

6. A gas-lamp comprising the lamp body or casing 7 with casing 7ª and bowl 4, the hinged or pivoted gas-supply pipe 3, 3ª, 3ᵇ with burners 1 arranged as specified and the combined reflector 5 air-supply chamber 5ᵇ and chimney 8, 8ª, said reflector having air-supply openings 10 equal in number to said burners and each arranged directly above a burner, and a raised central portion with one or more exit-openings communicating with said chimney, substantially as described.
7. A gas-lamp reflector formed with a central raised portion having one or more exit-openings for hot gases and provided at its outer portion with an air-supply chamber having one or more comparatively large air-outlet openings 10 in its lower side, substantially as described for the purpose specified.

8. A gas-lamp reflector formed with a central raised portion having one or more rows of exit-openings arranged around a closed center, and provided at its outer portion with an air-supply chamber having one or more comparatively large air-outlet openings 10 in its lower side, substantially as described.

9. A gas-lamp reflector having a central raised portion provided with one or more exit-openings for hot gases, and a hollow outer portion forming an air-supply chamber 5ᵇ having its inlet and outlet openings 9ª and 10 out of line with each other, and the latter in the lower outer portion of the reflector, substantially as described.

10. A gas-lamp reflector having a central raised portion 5ᶜ with annular row of openings 5ᵈ and a flat conical outer portion provided with one or more openings 10 and an air-chamber 5ᵇ located above said outer portion of reflector and in communication with the opening or openings 10 therein, the inlet or inlets 9ª to said air-chamber being out of line with said outlet or outlets, substantially as described for the purpose specified.

11. The improved combined gas-lamp reflector air-supply chamber and chimney, comprising the reflector proper 5 with raised central portion 5ᶜ, exit-openings 5ᵈ and one or more air-openings 10 the air-supply chamber 5ᵇ with air-inlets 9ª in its top, and the chimney 8 with enlarged lower part 8ª connected with said reflector and air-chamber, all substantially as described.

In testimony whereof we have signed our names to this specification in the presence of two subscribing witnesses.

THOMAS COOPER JOHN THOMAS.
WILLIAM MUDD STILL.

Witnesses:
PERCY E. MATTOCKS,
WM. O. BROWN.